United States Patent [19]

Hayasaki

[11] Patent Number: 4,966,263

[45] Date of Patent: Oct. 30, 1990

[54] SYSTEM FOR CONTROLLING LOCK-UP CLUTCH

[75] Inventor: Koichi Hayasaki, Fujisawa, Japan

[73] Assignee: Nissan Motor Co., Ltd., Yokohama City, Japan

[21] Appl. No.: 438,205

[22] Filed: Nov. 20, 1989

[30] Foreign Application Priority Data

Nov. 22, 1988 [JP] Japan ............................ 63-151341[U]

[51] Int. Cl.⁵ ........................ F16H 61/14; F16D 25/14
[52] U.S. Cl. ...................................... 192/3.3; 192/3.57
[58] Field of Search ....................... 192/3.28, 3.29, 3.3, 192/3.57; 137/625.66

[56] References Cited

U.S. PATENT DOCUMENTS

| 4,051,193 | 10/1977 | Arai et al. | 192/3.3 |
|---|---|---|---|
| 4,431,095 | 2/1984 | Suga | 192/3.29 |
| 4,561,528 | 12/1985 | Sugano | 192/3.3 |
| 4,585,102 | 4/1986 | Sugano | 192/3.29 |
| 4,607,731 | 8/1986 | Sugano | 192/3.29 |
| 4,618,038 | 10/1986 | Ogasawara et al. | 192/3.29 |
| 4,706,790 | 11/1987 | Lockhart et al. | 192/3.3 |
| 4,720,003 | 1/1988 | Murasugi | 192/3.3 |
| 4,730,521 | 3/1988 | Hayasaki et al. | 74/867 |
| 4,732,245 | 3/1988 | Hiramatsu | 192/3.3 |
| 4,744,269 | 5/1988 | Greene et al. | 192/3.3 |
| 4,768,632 | 9/1988 | Moan | 192/3.3 |
| 4,768,635 | 9/1988 | Sakurai et al. | 192/3.3 |
| 4,843,920 | 7/1989 | Hayasaki et al. | 192/3.3 |
| 4,876,923 | 10/1989 | Crandall et al. | 192/3.3 |
| 4,880,090 | 11/1989 | Ando | 192/3.3 |
| 4,880,091 | 11/1989 | Hasegawa et al. | 192/3.3 |

FOREIGN PATENT DOCUMENTS 62-62047 3/1987 Japan.

OTHER PUBLICATIONS

"Nissan Cedric, Gloria, Introduction to Modifications of Y31 Type Series," Service Manual No. 626 (YA1-3-,YB1-3), Nissan Motor Co., Ltd. Jun. 1989.

Primary Examiner—Leslie A. Braun
Assistant Examiner—Nicholas Whitelaw
Attorney, Agent, or Firm—Foley & Lardner, Schwartz, Jeffery, Schwaab, Mack, Blumenthal & Evans

[57] ABSTRACT

A system for controlling a lock-up clutch comprises a lock-up control valve including a spool and a plug in a spool bore. The spool is movable between a lock-up clutch engagement position and a lock-up clutch disengagement position. The plug is axially movably inserted at one end of the spool bore, and has a pressure acting area whose diameter is larger than the maximal diameter of the spool. This pressure acting area is subject to a pressure when the transmission establishes the first or reverse speed. Thus, in the event the transmission establishes the first or reverse speed, the spool is displaced to the lock-up clutch disengagement position by a force applied to the pressure acting area of the plug.

6 Claims, 2 Drawing Sheets

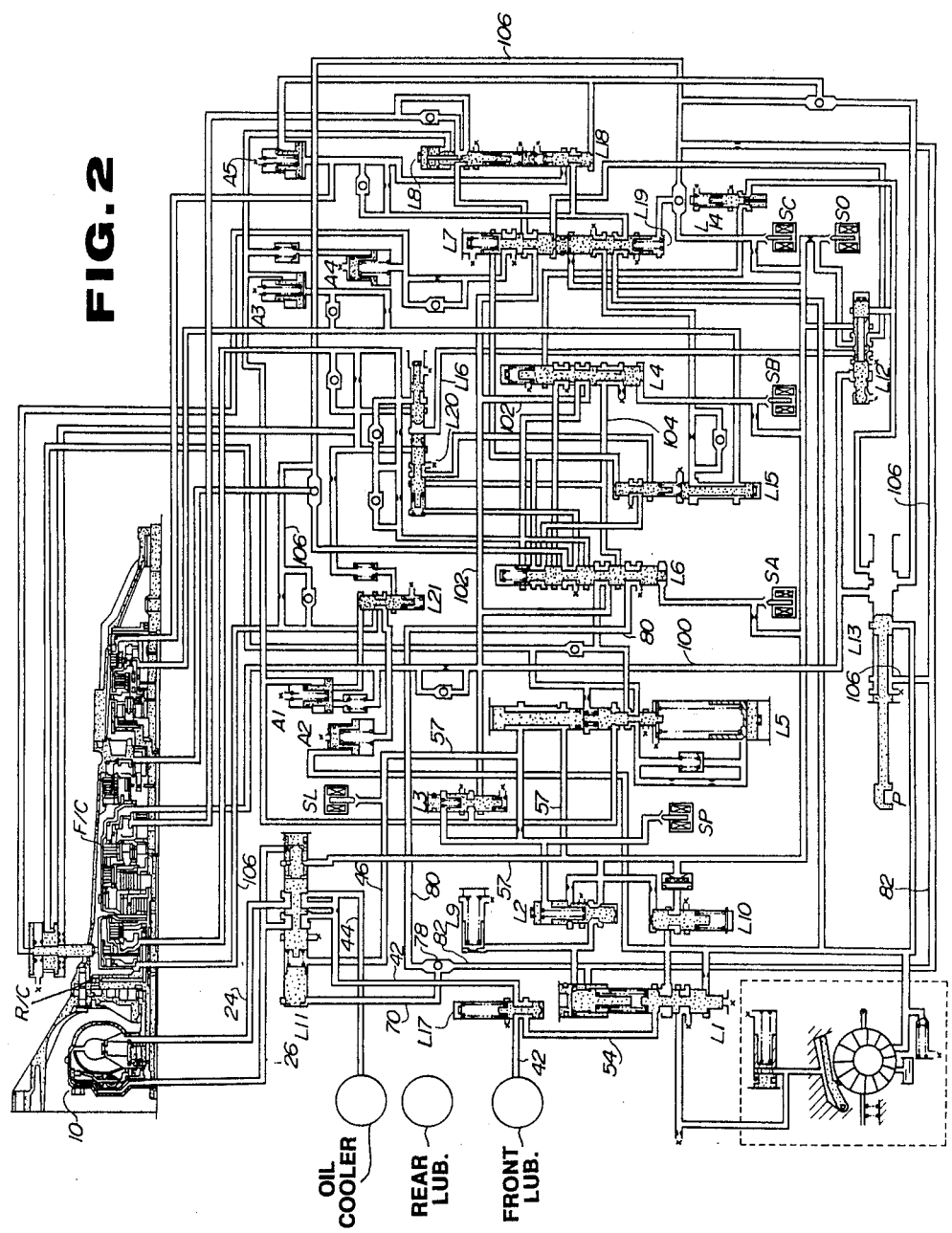

SYSTEM FOR CONTROLLING LOCK-UP CLUTCH

BACKGROUND OF THE INVENTION

The present invention relates to a system for controlling a lock-up clutch.

A system for controlling a lock-up clutch of the prior art is disclosed, for example, in U.S. Pat. No. 4,730,521 issued to Hayasaki et al. or the corresponding Japanese Provisional Patent Publication No. 62-62047. This system comprises a lock-up control valve which controls an operation of a lock-up clutch of a torque converter. The lock-up control valve is controlled by a solenoid pressure which is controlled by varying a duty ratio of an electric current supplied to a solenoid.

The solenoid pressure is not always supplied to the lock-up control valve. Specifically, it is supplied to the lock-up control valve during operation with a gear position higher than first speed position only. A constant pressure is supplied to the lock-up control valve during operation with the first speed position or where R, N or P range is selected, thus holding the lock-up control valve in a lock-up clutch disengagement position. Such shift is effected by a shuttle shift valve. Specifically, the shuttle shift valve is switched by a second speed brake pressure which is present during operation with the second to the fourth speed positions. The shuttle shift valve allows the solenoid pressure to be supplied to the lock-up control valve when the second speed pressure is present, while it allows the constant pressure to be supplied to the lock-up control valve when the second speed pressure is not present. During operation where it is desired to engage the lock-up clutch, even if the solenoid is kept operated owing to a failure of the solenoid or a control unit, the lock-up control valve is held in the lock-up clutch disengagement position, since the shuttle shift valve ensures the supply of the constant pressure to the lock-up control valve as long as the second speed pressure is absent. In this manner, the vehicle can perform an emergency running such that the lock-up clutch is disengaged during operation with the first speed position although it is kept engaged at a speed position higher than the first speed position.

A problem encountered with the above-mentioned system is that the shuttle shift valve is needed and thus a setting space of the shuttle shift valve and that of hydraulic passages for connecting this valve with the lock-up control valve, etc., are required, resulting in enlargement of the overall dimension and increased manufacturing cost.

An object of the present invention is provide a system for controlling a lock-up clutch wherein the shuttle shift valve of the above type is eliminated.

SUMMARY OF THE INVENTION

There is provided, according to the present invention, a system for controlling a lock-up clutch of a hydraulic torque transmitting device including a pump impeller and a turbine runner, the lock-up clutch being hydraulically engaged to mechanically connect the turbine runner with the pump impeller, the lock-up clutch being disengaged to mechanically disconnect the turbine runner from the pump impeller, the system comprising:

a lock-up control valve including a spool having a lock-up clutch engagement position and a lock-up clutch release position;

hydraulic means fluidly disposed between the hydrodynamic torque transmitting device and said lock-up control valve for supplying hydraulic fluid to the hydrodynamic device to cause engagement of the lock-up clutch when said spool of said lock-up control valve assumes said lock-up clutch engagement position and to allow disengagement of said lock-up clutch when said spool of said lock-up control valve assumes said lock-up clutch release position;

means for hydraulically biasing said spool to one of said lock-up clutch engagement and release positions, selectively;

said lock-up control valve including a plug with a pressure acting area, said plug being adapted to lock said spool to said lock-up clutch release position when said pressure acting area is exposed to a predetermined hydraulic pressure;

means for generating a first speed indicative hydraulic pressure signal;

means for generating a reverse speed indicative hydraulic pressure signal;

hydraulic passage means fluidly disposed between said first speed indicative hydraulic pressure signal generating means, said reverse speed indicative hydraulic pressure signal generating means, and said pressure acting area of said plug, said hydraulic passage means allowing passage of one of said hydraulic pressure signals to act on said pressure acting area as said predetermined hydraulic pressure.

BRIEF DESCRIPTION OF THE DRAWINGS

FIG. 2 is a hydraulic circuit incorporating the system shown in FIG. 1.

DETAILED DESCRIPTION OF THE INVENTION

Figure 1:
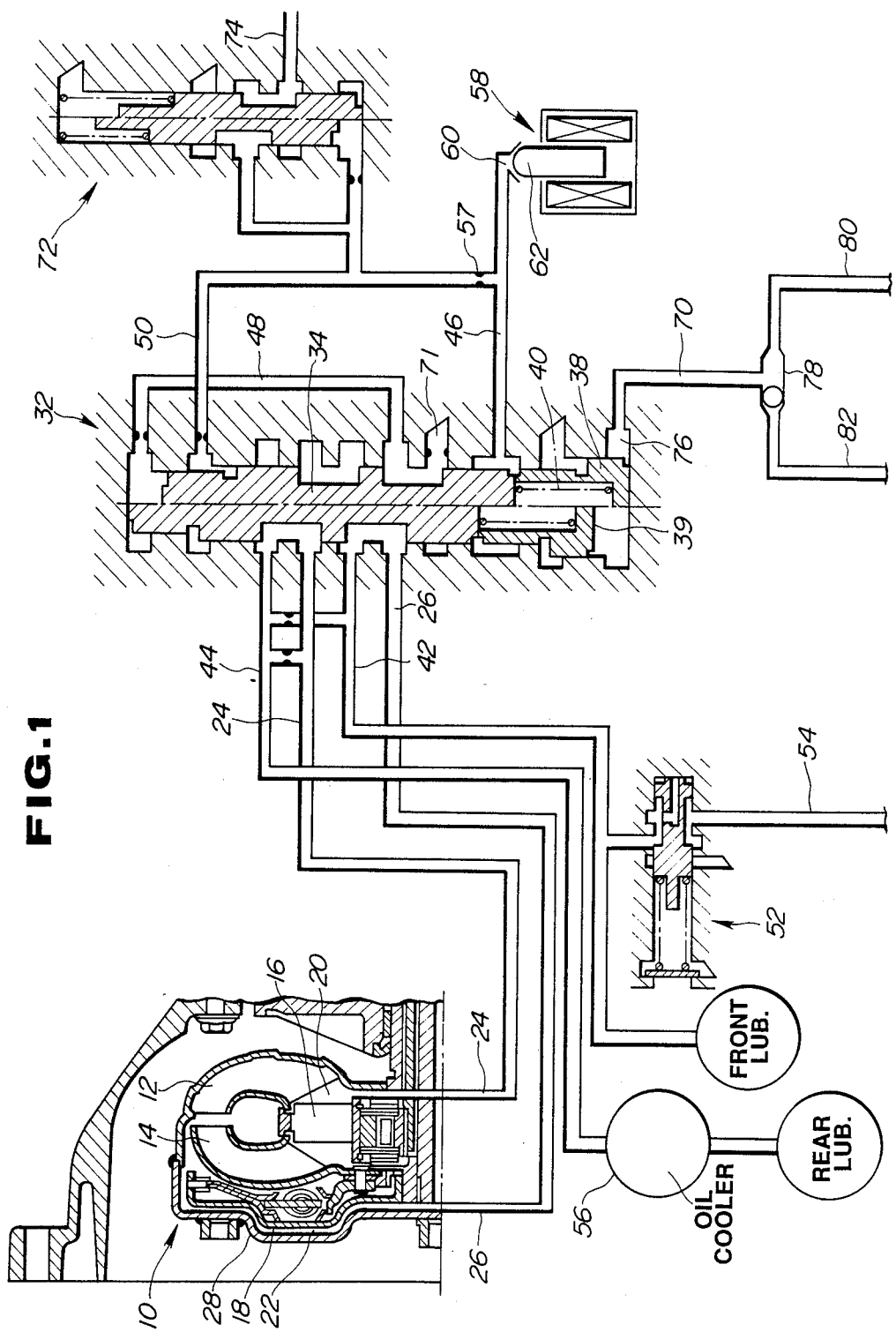
FIG. 1 is a fragmentary view of a system embodying the present invention.

Referring to FIG. 1, a torque converter 10 includes a pump impeller 12, a turbine runner 14, a stator 16, and a lock-up clutch 18. The lock-up clutch 18 defines on the righthand side thereof, as viewed in FIG. 1, a clutch apply chamber 20 where the pump impeller 12 and the turbine runner 14 are arranged, and it also defines on the lefthand side thereof, as viewed in FIG. 1, a clutch release chamber 22. The apply chamber 20 is connected with a hydraulic passage 24, and the release chamber 22 is connected with a hydraulic passage 26. The hydraulic passages 24 and 26 are connected with a lock-up control valve 32 such that they are selectively subject to a source of hydraulic fluid pressure. The lock-up control valve 32 includes a spool 34, a plug 38, and a spring 40. The spool 34 and the plug 38 are axially movably inserted in a common spool bore. A diameter of a land at the lower end of the plug 38 as viewed in FIG. 1 is larger than the largest diameter of the spool 34. The spring 40 is arranged between the spool 34 and the plug 38. As shown in FIG. 1, the lock-up control valve 32 is connected with hydraulic passages 42, 44, 46, 48 and 50 in addition to the hydraulic passages 24 and 26. Under a torque converter relief pressure, hydraulic fluid is supplied to the hydraulic passage 42 from a torque converter relief valve 52. The torque converter relief valve 52 is supplied with pressurized hydraulic fluid via a hydraulic passage 54 from a pressure regulator valve (not shown), and effects a pressure regulation, thus preventing excessive rise in torque operating pressure within the torque converter 10. The hydraulic passage 44 is connected with an oil cooler 56. The hydraulic fluid flowing out of the oil cooler 56 is used for lubrication. Under a constant pilot pressure generated by a pilot valve 72, hydraulic fluid is supplied to the hydraulic passage 50. The pilot valve 72 is supplied with hydraulic fluid under a line pressure via a hydraulic passage 74 from the pressure regulator. The hydraulic passage 46, which is derived from the hydraulic passage 50 through an orifice 57, is connected with a lock-up solenoid 58. The lock-up solenoid 58 is provided with a plunger 62 which closes a drain opening 60 of the hydraulic passage 46 in the event the electric current passing through the solenoid 58 is off, and opens the drain opening 60 in the event the electric current is on. Regarding an operation of the lock-up solenoid 58, duty ratio thereof is controlled by a signal from a control unit (not shown). Specifically, the lock-up solenoid 58 is repeatedly turned on and turned off in a predetermined period of time, and it keeps the drain opening 60 open in accordance with a ratio of an turned-on time to the period of time, thus adjusting the hydraulic pressure of the hydraulic passage 46 in a manner to be in inverse proportion to the turned-on time ratio. The hydraulic passage 70 is connected with a hydraulic passage 76 which supplies the hydraulic pressure to a pressure acting area 39 on the lower end of the plug 38, and also it is connected with an output port of a ball type shuttle valve 8. The shuttle valve 78 is connected with a hydraulic passage 80 and a hydraulic passage 82 at its input port, and it allows output of the higher one of the hydraulic pressure of the hydraulic passage 80 and that of the hydraulic passage 82. The hydraulic passage 80 is subject to a first speed indicative hydraulic pressure signal, while the hydraulic passage 82 is subject to a reverse speed indicative hydraulic pressure signal. The hydraulic passage 82 is connected with a hydraulic passage communicating with a servo chamber of a reverse clutch that is engaged only when the transmission is to establish the reverse speed. The hydraulic passage 80 is connected with a shift valve A at a port that is always drained except when the transmission establishes the first speed.

A hydraulic control circuit incorporating the shift valve A of the above character is briefly described in connection with FIG. 2.

Referring to FIG. 2, the hydraulic control circuit comprises components as follows:

L1 . . . pressure regulator valve
L2 . . . pressure modifier valve
L3 . . . accumulator control valve
L4 . . . shift valve B
L5 . . . 1-2 accumulator valve & piston
L6 . . . shift valve A
L7 . . . overrunning clutch control valve
L8 . . . overrunning clutch reducing valve
L9 . . . modifier accumulator valve
L10 . . . pilot valve
L11 . . . lock-up control valve
L12 . . . shuttle shift valve
L13 . . . manual valve
L14 . . . 1st. reducing valve
L15 . . . 5-2 relay valve
L16 . . . 3-2 timing valve
L17 . . . torque converter relief valve
L18 . . . reduction timing valve
L19 . . . reduction shift valve
L20 . . . 5-2 sequence valve
L21 . . . accumulator shift valve
A1 . . . N-D accumulator
A2 . . . 2-3 accumulator
A3 . . . 3-4 accumulator
A4 . . . 4-5 accumulator
A5 . . . reduction brake accumulator
SA . . . shift solenoid A
SB . . . shift solenoid B
SC . . . shift solenoid C
SL . . . lock-up solenoid
SO . . . overrunning clutch solenoid
SP . . . line pressure solenoid.

This hydraulic control circuit is used in a known automatic transmission of the RE5R01A type manufactured in Japan by Nissan Motor Co., Ltd. and described in Service Manual No. 626 (YA1-3, YA1B) "Nissan Cedric, Gloria, Introduction to Modifications of Y31 type series" issued in June 1989 by Nissan Motor Co., Ltd. Particular attention should be paid to pages C-22 to C-35 thereof.

The function of each of the above listed components is explained briefly. The pressure regulator valve L1 is supplied with oil discharged by the oil pump and effects pressure regulation to generate a line pressure appropriately adjusted to varying running conditions of the automotive vehicle. The pressure modifier valve L2 serves as a signal generating valve for the pressure regulator L1 and generate a pressure modifier pressure applied, as a signal pressure, on the pressure regulator valve L1.

The accumulator control L3 has function to effect pressure regulation to generate an accumulator control pressure acting on accumulator pistons of the N-D accumulator A1, 3-4 accumulator A3 and 1-2 accumulator valve L5. The shift valve B L4 is shiftable on output pressure of the shift solenoid B SB and cooperates with the shift valve A L6 to switch pressure delivery path in order to induce an automatic shift between the first, second and third speeds and between the fourth and fifth speeds. The overrunning clutch control valve L7 takes place a switching between the hydraulic passage of the overrunning clutch and that of the brake band for preventing the overrunning clutch from simultaneously operating when the brake band is operated at the fifth speed (if the overrunning clutch is engaged at the fifth speed, interlock is induced). In order to attenuate an engine brake shock, the overrunning clutch reducing valve L8 adjusts the line pressure to an optimal level so called an overrunning clutch reducing pressure, and supplies it to the overrunning clutch. This valve L8 is subject to the accumulator control pressure to adjust a pressure regulating point, thus adapting the clutch capacity to varying running conditions of the automotive vehicle. The modifier accumulator valve L9 prevents the line pressure from rippling by smoothing the pressure modifier pressure adjusted by the pressure modifier valve L2.

The pilot valve L10 is used for producing a constant pressure so called a pilot pressure necessary to the line pressure control, transmission control, lock-up control, overrunning clutch control by adjusting the line pressure. The lock-up control valve L11 puts the lock-up in an engaging condition or a disengaging condition, and it effects the lock-up engagement transitionally, which allows a smoothe lock-up operation. The shuttle shift valve L12 is a component of the hydraulic circuit and fixed by a plug. The manual valve L13 is a valve which distributes the line pressure to a circuit or circuits in response to each selected of P, R, N, D, 3, and 2, 1 range positions. In order to attenuate an engine brake shock when the transmission is shifted from the second speed to the first speed with "1" range position, the 1st. reducing valve L14 functions to adjust the line pressure to an optimal level so called a 1st. reducing pressure upon engagement of the low & reverse brake and to supply it the low & reverse brake. The 5-2 relay valve L15 memories that the transmission falls in the fifth speed, and it cooperates with the 5-2 sequence valve L20 and the shift valve A L6 in preventing the transmission from shifting the fifth speed →the third speed →the second speed upon downshifting from the fifth speed to the second speed. The 3-2 timing valve L16 is a component of the hydraulic circuit and fixed by a steel ball. The torque converter relief valve L17 has as its function to adjust the line pressure to an optimal level so called a torque converter acting pressure so as to prevent the pressure supplied to the torque converter from being excessive. The reduction timing valve L18 takes place a switching between the reduction brake operating timing where the transmission is downshifted from "D" range position by stepping on the accelerator, and that where the engine brake is operated by selecting from "D" range position to "3" or "2" range position. In the later event, this valve L18 engages the reduction brake earlier to prevent the engine brake from inducing a delayed operation. The reduction shift valve L19 effects a switching of the hydraulic passage by the pressure outputted from the shift solenoid C SC in response to varying running conditions of the automotive vehicle, thus shifting automatically from the third speed to the fourth speed or in reverse. The 5-2 sequence valve L20 functions to prevent a drainage of the brake band acting pressure which is present at the fifth speed until the high clutch acting pressure and brake disengaging pressure in the same circuit are drained upon donwshifting from the fifth speed to the second speed. The accumulator shift valve L21 connects the high clutch acting pressure circuit and brake band disengaging pressure circuit (the same circuit) to the 2-3 accumulator A2 with the forward range position so as to rise smoothly the high cluth engagement acting pressure and brake band disengagement acting pressure upon shifting from the second speed to the third speed. On the other hand, this valve L21 connects the reverse clutch disengagement acting circuit to the 2-3 accumulator A2 with "R" range position so as to rise smoothly the reverse clutch engagement acting pressure upon selecting "R" range position.

Comparing FIG. 2 with FIG. 1 reveals that the pilot valve L10 corresponds to the pilot valve 72, the lock-up solenoid SL corresponds to the lock-up solenoid 58, the lock-up control valve L11 corresponds to the lock-up control valve 30, and the torque converter relief valve L17 corresponds to the torque converter relief valve 52. Thus, the corresponding passages shown in FIG. 2 are desisgnated by the same reference numerals as those used in FIG. 1 in order to make clear that FIG. 1 is a fragmentary portion of FIG. 2.

Briefly, the first speed is established when the shift valves A L6 and B L4 are both upshifted. Under this condition, the line pressure is supplied via a hydraulic passage 100 to a forward clutch F/C to activate same. The same line pressure is supplied via a branch passage 102 to the shift valve B L4. Since the shift valve B L4 is upshifted to allow communication between the branch passage 102 and a passage 104 leading to the shift valve A L6, the line pressure is supplied to the shift valve A L6. Since the shift valve A L6 is also upshifted, the passage 104 is allowed to communicate with the passage 80 leading to the shuttle valve 78. It will now be understood that the line pressure is supplied to the shuttle valve 78 when the shift valves A L6 and B L4 are both upshifted to establish the first speed. When the shift valve A L6 is downshifted, the passage 80 is connected to a drain port to be drained. Thus, the hydraulic pressure is supplied to the shuttle valve 78 only when the first speed is established. The hydraulic pressure within the passage 80 is thus called as the first speed indicative hydraulic pressure signal.

Briefly explaining the reverse speed indicative pressure signal, the hydraulic passage 82 is connected with a hydraulic passage 106 having one end connected to a "R" range port of the manual valve L13 and the oposite end connected to a servo chamber of a reverse clutch R/C. When the manual valve L13 is placed at the "R" (reverse) range position, the line pressure is supplied to the hydraulic passage 106 to activate the reverse clutch R/C. The same line pressure is supplied via the hydraulic passage 80 to the shuttle valve 78 as the reverse speed indicative hydraulic pressure signal.

Turning back to FIG. 1, the operation of the embodiment is described.

During operation with the first or reverse speed, the hydraulic chamber 76 is subject to the hydraulic pressure as high as the line pressure coming from the hydraulic passage 80 or the hydraulic passage 82 through the shuttle valve 78 and the hydraulic passage 70. As a result, the plug 38 is subject to an upward force as viewed in FIG. 1 and displaced upwardly, thus holding the spool 34 at a position illustrated by the left half thereof as viewed in FIG. 1. This position is achieved regardless of hydraulic pressure levels of the hydraulic passages 46, 48 and 50, because the pressure acting area 39 of the plug 38 is larger than any pressure acting area of the spool 34. In this state, the hydraulic fluid from the hydraulic passage 42 is supplied to the release chamber 22 through the hydraulic passage 26. The hydraulic fluid of the release chamber 22 flows into the apply chamber 20 passing through an aperture defined between a cover 28 and the lock-up clutch 18. Thereafter, it flows back to the lock-up control valve 32 through the hydraulic passage 24, and is discharged to the hydraulic passage 44. Specifically, the hydraulic fluid is supplied from the hydraulic passage 26 to the release chamber 22, and the discharged from the apply chamber 20 to the hydraulic passage 24. As a result, the hydraulic pressure within the release chamber 22 becomes equal to that within the apply chamber 20, although the hydraulic pressure within the apply chamber 20 is slightly low when the hydraulic fluid flows from the apply chamber 20 to the release chamber 22. This causes disengagement of the lock-up clutch 18, rendering the torque converter 10 operable in a torque converter state in which a torque is hydraulically transmitted. Thus, the disengagement of the lock-up clutch 18 is assured during operation with the first or the reverse speed.

During operation with a forward speed position other than the first speed or reverse, the hydraulic chamber 40 is not subject to the hydraulic pressure. Therefore, owing to the bias of the spring 40, the plug 38 assumes a position illustrated by the right half thereof as viewed in FIG. 1. At this position, the spool 34 of the lock-up control valve 32 is controlled by the lock-up solenoid 58. In the event the duty ratio of the lock-up solenoid 58 is zero, for example, the opening 60 is completely closed by the plunger 62. As a result, the hydraulic pressure equal to that in the hydraulic passage 50 is induced in the hydraulic passage 46, and it is supplied to the lower end of the spool 34 of the lock-up control valve 32 as viewed in FIG. 1.

Thus, the spool 34 falls in a state illustrated by the left half thereof as viewed in FIG. 1 (but the plug 38 is kept in a state illustrated by the right half thereof as viewed in FIG. 1), so that the hydraulic pressure is supplied from the release chamber 22, disengaging the lock-up clutch 18.

When turned-on time of the lock-up solenoid 58 is gradually increased in the state as mentioned above, the hydraulic fluid is discharged from the opening 60 in accordance with turned-on time, decreasing the hydraulic pressure in the hydraulic passage 46. As a result, the hydraulic pressure supplied to the lower end of the spool 34 of the lock-up control valve 32 as viewed in FIG. 1 is decreased, and the spool 34 is displaced downwardly as viewed in FIG. 1. When the spool 34 is displaced downwardly by a predetermined distance, the hydraulic passage 26 is slightly communicated with a port 71 for drainage. At the same time, the hydraulic passage 42 is communicated with the hydraulic passage 24. Since the hydraulic pressure of the hydraulic passage 26 is fed back to the upper end of the spool 34 as viewed in FIG. 1 through the hydraulic passage 48, the lock-up control valve 32 falls in a state of pressure regulation, and thus the hydraulic pressure of the hydraulic passage 26 is regulated in accordance with the hydraulic pressure supplied from the hydraulic passage 46 to the lower end of the spool 34 as viewed in FIG. 1. Specifically, in this state, the hydraulic pressure is supplied from the hydraulic passage 24 to the apply chamber 20. The hydraulic pressure of the apply chamber 20 is transmitted to the release chamber 22 passing through the aperture between the lock-up clutch 18 and the cover 28, and thereafter it is discharged from the hydraulic passage 26. The hydraulic pressure of the hydraulic passage 26 is controlled by the hydraulic pressure of the hydraulic passage 46 or the hydraulic pressure regulated in inverse proportion to the duty ratio of the lock-up solenoid 58. The hydraulic pressure of the release chamber 22 is lower than that the apply chamber 20 so that the lock-up clutch 18 is pressed to a friction surface of the cover 28. A force for pressing the lock-up clutch 18 is controlled by the lock-up solenoid 58 in a manner as described above.

Upon completion of a transitional slide control of the lock-up clutch 18 as mentioned above, the duty ratio of the lock-up solenoid 58 is 100%, result in the opening 60 being completely opened. As a result, the hydraulic pressure of the hydraulic passage 46 is zero, switching the spool 34 to a state illustrated by the right half thereof as viewed in FIG. 1. In this state, the hydraulic pressure is supplied from the hydraulic passage 24 to the apply chamber 20, and thus the lock-up clutch 18 is completely engaged.

In this embodiment, the first speed pressure and the reverse pressure are the hydraulic pressures outputted only at the first speed position and the reverse speed position, respectively. Alternatively, the hydraulic pressure outputted at the first speed position and the second speed position may be used as the first speed pressure, for example. It is to be noted that in this event the lock-up clucth 18 can not be engaged at the second speed position.

What is claimed is:

1. A system for controlling a lock-up clutch of a hydraulic torque transmitting device including a pump impeller and a turbine runner, the lock-up clutch being hydraulically engaged to mechanically connect the turbine runner with the pump impeller, the lock-up clutch being disengaged to mechanically disconnect the turbine runner from the pump impeller, the system comprising:

a lock-up control valve including a spool having a lock-up clutch engagement position and a lock-up clutch release position;

hydraulic means fluidly disposed between the hydrodynamic torque transmitting device and said lock-up control valve for supplying hydraulic fluid to the hydrodynamic device to cause engagement of the lock-up clutch when said spool of said lock-up control valve assumes said lock-up clutch engagement position and to allow disengagement of said lock-up clutch when said spool of said lock-up control valve assumes said lock-up clutch release position;

means for hydraulically biasing said spool to one of said lock-up clutch engagement and release positions, selectively;

said lock-up control valve including a plug with a pressure acting area, said plug being adapted to lock said spool to said lock-up clutch release position when said pressure acting area is exposed to a predetermined hydraulic pressure;

means for generating a first speed indicative hydraulic pressure signal;

means for generating a reverse speed indicative hydraulic pressure signal;

hydraulic passage means fluidly disposed between said first speed indicative hydraulic pressure signal generating means, said reverse speed indicative hydraulic pressure signal generating means, and said pressure acting area of said plug, said hydraulic passage means allowing passage of one of said hydraulic pressure signals to act on said pressure acting area as said predetermined hydraulic pressure.

2. A system as claimed in claim 1, wherein said hydraulic means include a pressure regulator valve, a torque converter relief valve, and hydraulic passages.

3. A system as claimed in claim 1, wherein said spool hydraulically biasing means include a lock-up solenoid, a pilot valve, and hydraulic passages.

4. A system as claimed in claim 1, wherein said first speed indicative hydraulic pressure signal generating means include shift valves.

5. A system as claimed in claim 1, wherein said reverse speed indicative hydraulic pressure signal generating means include a manual valve.

6. A system as claimed in claim 1, wherein said hydraulic passage means include a shuttle valve and hydraulic passages.

* * * * *